United States Patent
Pan et al.

(10) Patent No.: US 11,706,794 B2
(45) Date of Patent: Jul. 18, 2023

(54) PHYSICAL RANDOM ACCESS FOR NR-U

(71) Applicant: InterDigital Patent Holdings, Inc., Wilmington, DE (US)

(72) Inventors: Kyle Jung-Lin Pan, Saint James, NY (US); Fengjun Xi, San Diego, CA (US); HaoHao Qin, San Diego, CA (US); Chunxuan Ye, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/535,140

(22) Filed: Aug. 8, 2019

(65) Prior Publication Data
US 2020/0053772 A1 Feb. 13, 2020

Related U.S. Application Data

(60) Provisional application No. 62/716,116, filed on Aug. 8, 2018.

(51) Int. Cl.
*H04W 74/00* (2009.01)
*H04W 48/10* (2009.01)
(Continued)

(52) U.S. Cl.
CPC ........ *H04W 74/006* (2013.01); *H04B 17/327* (2015.01); *H04W 48/10* (2013.01); *H04W 56/0015* (2013.01); *H04W 74/0808* (2013.01)

(58) Field of Classification Search
None
See application file for complete search history.

(56) References Cited

U.S. PATENT DOCUMENTS

2018/0324850 A1* 11/2018 Amuru .................. H04L 5/0053
2019/0053281 A1* 2/2019 Strom ............... H04W 72/0413
(Continued)

FOREIGN PATENT DOCUMENTS

CN  109729580  * 1/2018

OTHER PUBLICATIONS

ITU-R, "IMT Vision—Framework and Overall Objectives of the Future Development of IMT for 2020 and Beyond", Recommendation ITU-R M.2083-0, M Series, Mobile, Radiodetermination, Amateur and Related Satellite Services, Sep. 2015, 21 pages.

*Primary Examiner* — Andre Tacdiran
(74) *Attorney, Agent, or Firm* — Condo Roccia Koptiw LLP

(57) ABSTRACT

Systems, methods, and instrumentalities are disclosed herein associated with physical random access, e.g., for new radio (NR) implementations such as NR-unlicensed (NR-U). A wireless transmit/receive unit (WTRU) may switch a position of a PRACH occasion (RO) with another RO to reduce latency (e.g., so that a WTRU can transmit a preamble without performing a LBT operation). Systems, methods, and instrumentalities are disclosed for reserving a listen-before-talk (LBT) procedure gap at the beginning of a random access channel (RACH) occasion (RO) in New Radio (NR) unlicensed (NR-U) systems. The present systems, methods, and instrumentalities may (e.g., may also) be applied to consecutive ROs. This may include reserving a LBT gap for example, for a RO transmission (e.g., for each of the consecutive ROs). Low latency RACH for NR-U systems may be supported (e.g., mapping rules for the RO may be implemented).

21 Claims, 14 Drawing Sheets

(51) Int. Cl.
*H04B 17/327* (2015.01)
*H04W 74/08* (2009.01)
*H04W 56/00* (2009.01)

(56) References Cited

U.S. PATENT DOCUMENTS

| | | | |
|---|---|---|---|
| 2019/0150190 A1* | 5/2019 | Kim | H04W 74/0833 |
| | | | 370/329 |
| 2019/0182870 A1* | 6/2019 | Shih | H04W 74/004 |
| 2019/0208548 A1* | 7/2019 | Shih | H04W 24/10 |
| 2019/0223163 A1* | 7/2019 | Ko | H04W 48/12 |
| 2019/0268947 A1* | 8/2019 | Zhang | H04W 74/0833 |
| 2019/0320469 A1* | 10/2019 | Huang | H04L 5/0053 |
| 2019/0387546 A1* | 12/2019 | Li | H04W 74/0833 |
| 2021/0014889 A1* | 1/2021 | Liu | H04L 5/0091 |
| 2021/0014902 A1* | 1/2021 | Guo | H04W 74/0833 |
| 2021/0037487 A1* | 2/2021 | Ohara | H04W 56/001 |
| 2021/0037488 A1* | 2/2021 | Ko | H04L 5/00 |
| 2021/0112602 A1* | 4/2021 | Li | H04W 72/042 |
| 2021/0185734 A1* | 6/2021 | Li | H04L 5/0048 |
| 2021/0307061 A1* | 9/2021 | Huang | H04W 74/006 |

* cited by examiner

| SSB0 | SSB1 | RO 0 / RO 1 | RO 2 / RO 3 | SSB2 | RO 4 / RO 5 |

FIG. 2

| SSB0 | SSB1 | RO-SSB0 / RO-SSB0 | RO-SSB1 / RO-SSB1 | SSB2 | RO-SSB2 / RO-SSB2 |

NR configuration with number of SSB per RO = 1/2

FIG. 3

| SSB0 | SSB1 | RO-SSB1 / RO-SSB1 | RO-SSB0 / RO-SSB0 | SSB2 | RO-SSB2 / RO-SSB2 |

Switching the mapping

FIG. 4A

PHYSICAL RANDOM ACCESS FOR NR-U

CROSS REFERENCE TO RELATED APPLICATIONS

This application claims the benefit of U.S. Provisional Patent Application No. 62/716,116, filed Aug. 8, 2018, the contents of which are hereby incorporated by reference herein.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems, methods, and instrumentalities are disclosed herein associated with physical random access, e.g., for new radio (NR) implementations such as NR-unlicensed (NR-U). A wireless transmit/receive unit (WTRU) may switch a position of a PRACH occasion (RO) with another RO to reduce latency (e.g., so that a WTRU can transmit a preamble without performing a LBT operation). The WTRU may use a first mapping to determine a first order of a plurality of SS/PBCH blocks (SSBs) and a plurality of PRACH occasions (ROs). According to the first order, a first RO may follow a first SSB. The WTRU may determine if the first RO and the first SSB have a same index. The WTRU may use the first order if the first RO and the first SSB have the same index. If, according to the first mapping, the first RO and the first SSB do not have the same index, the WTRU may use a second mapping to determine a second order associated with the plurality of SSBs and the plurality of ROs. The second mapping may locate a second RO with a same index as the first SSB so that the second RO follows the first SSB. If the second mapping is used, the WTRU may transmit a preamble in the second RO after reception of the first SSB without performing a listen before talk operation.

BRIEF DESCRIPTION OF THE DRAWINGS

FIG. 2 is an example of synchronization signal block (SSB) and random access channel (RACH) occasion (RO) configuration.

FIG. 3 is an example of mapping between SSB and RO for New Radio (NR).

FIG. 4A is an example of mapping between SSB and RO for NR unlicensed (NR-U).

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
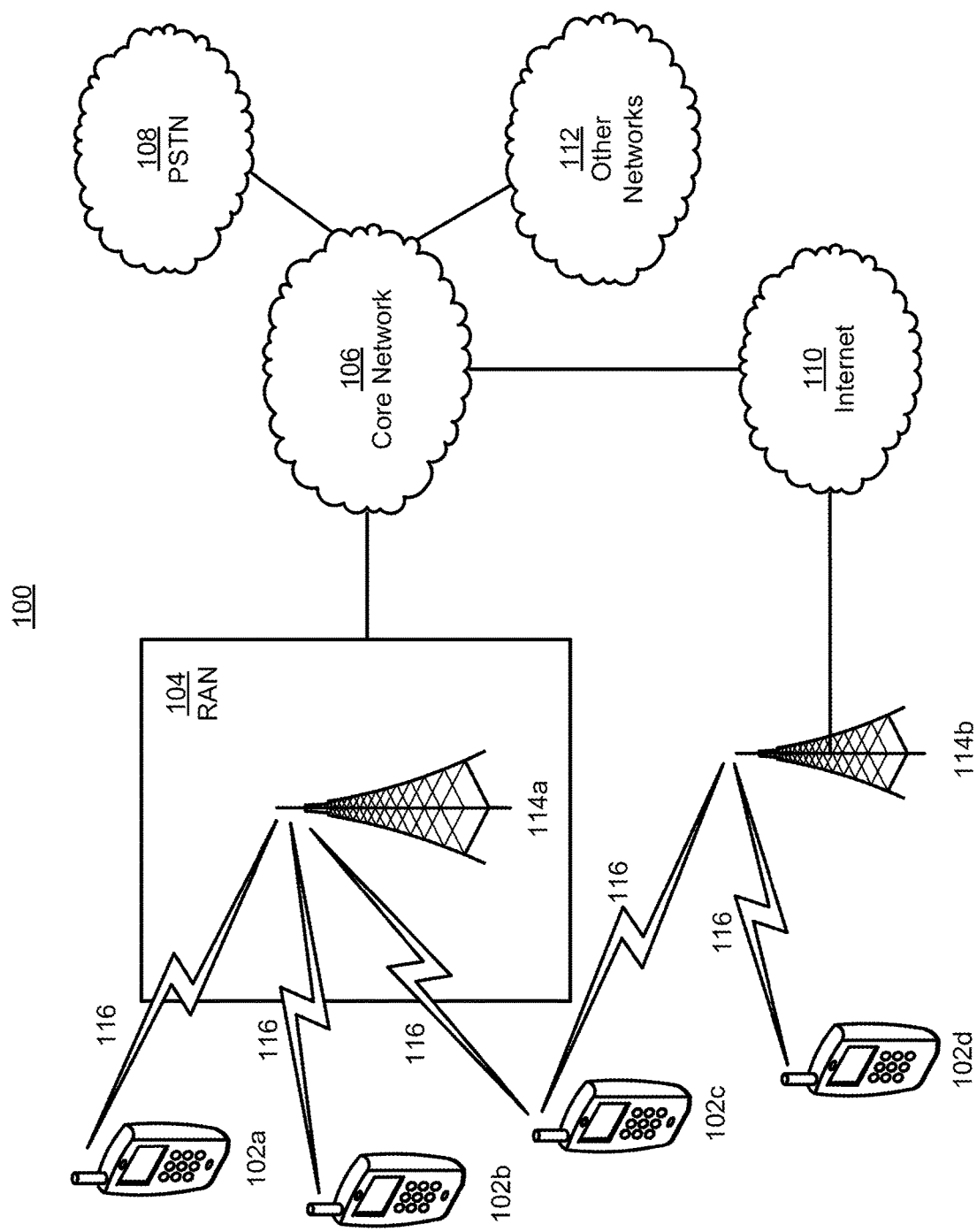
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
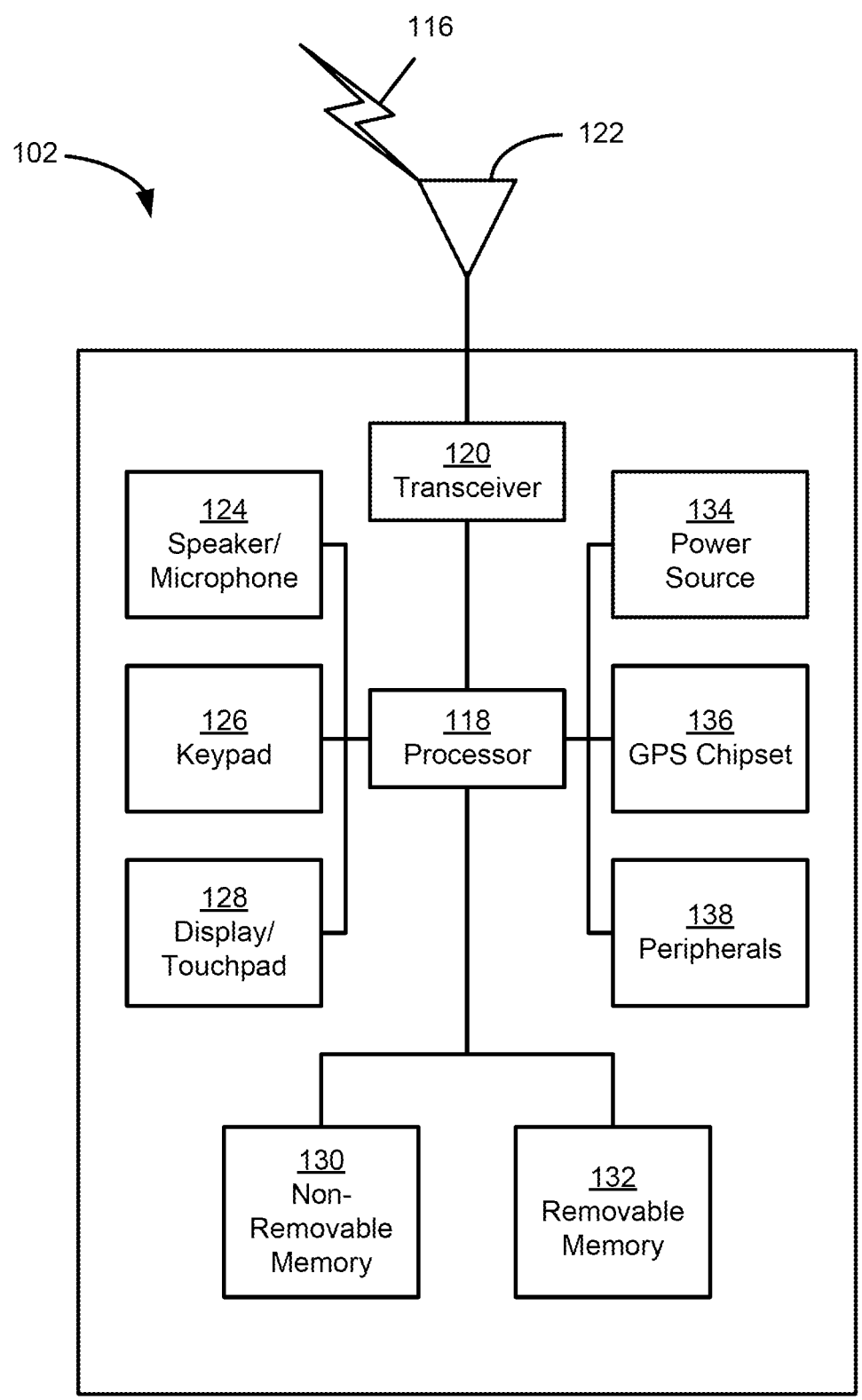
FIG. 1B is a system diagram illustrating an example wireless transmit/receive unit (WTRU) that may be used within the communications system illustrated in FIG. 1A according to an embodiment.
Figure 1C:
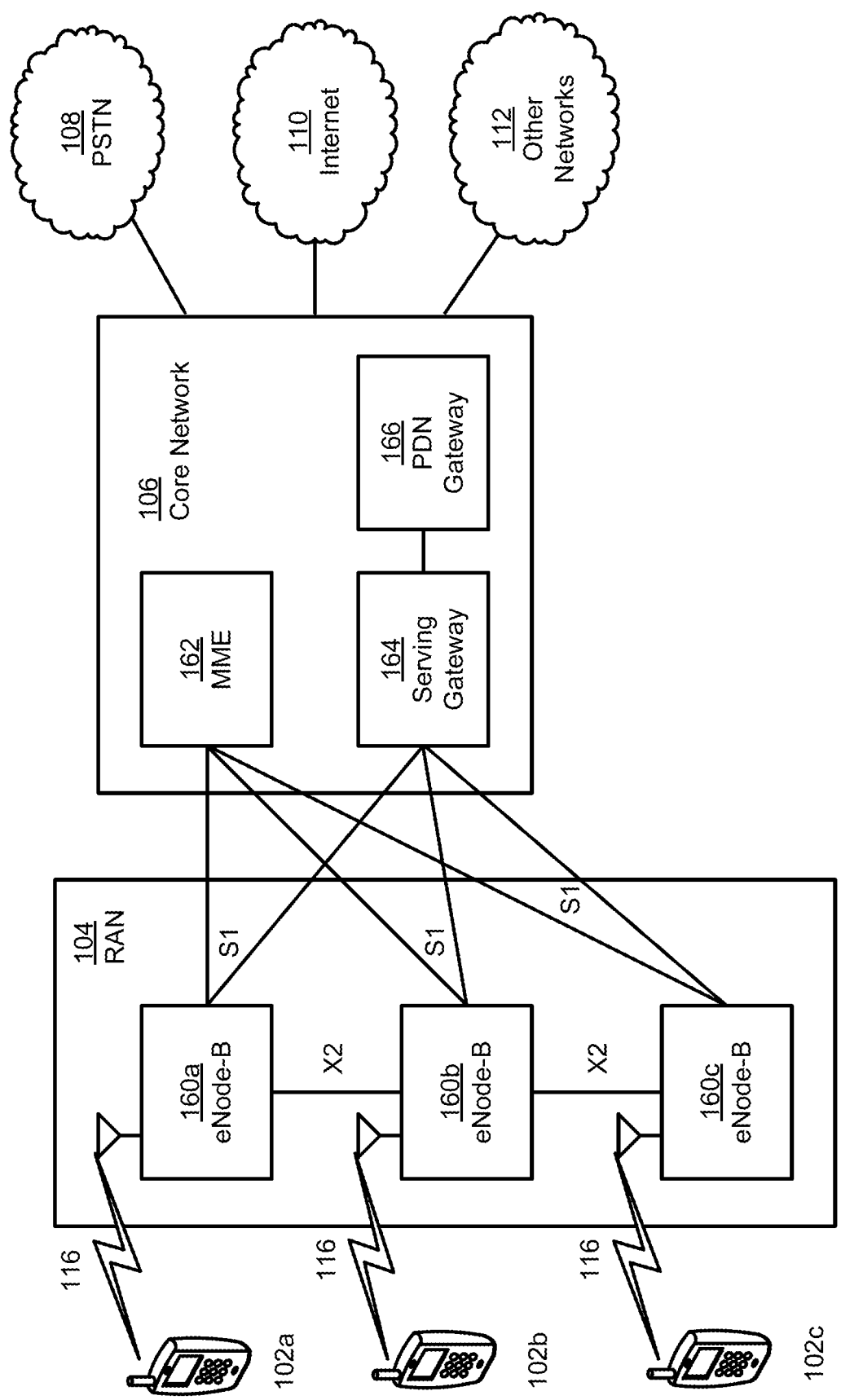
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figures 10, 11, 12:
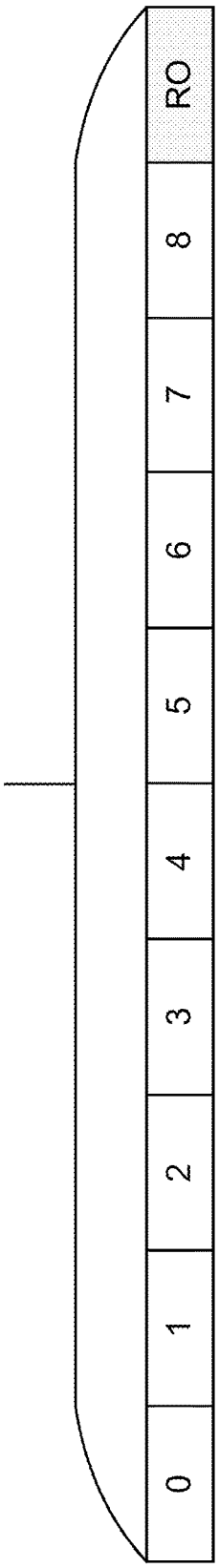
FIG. 10 is an example of LBT ROs.
FIG. 11 is an example of reservation signals for consecutive ROs.
FIG. 12 is an example of an isolated RO.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

Figure 1D:
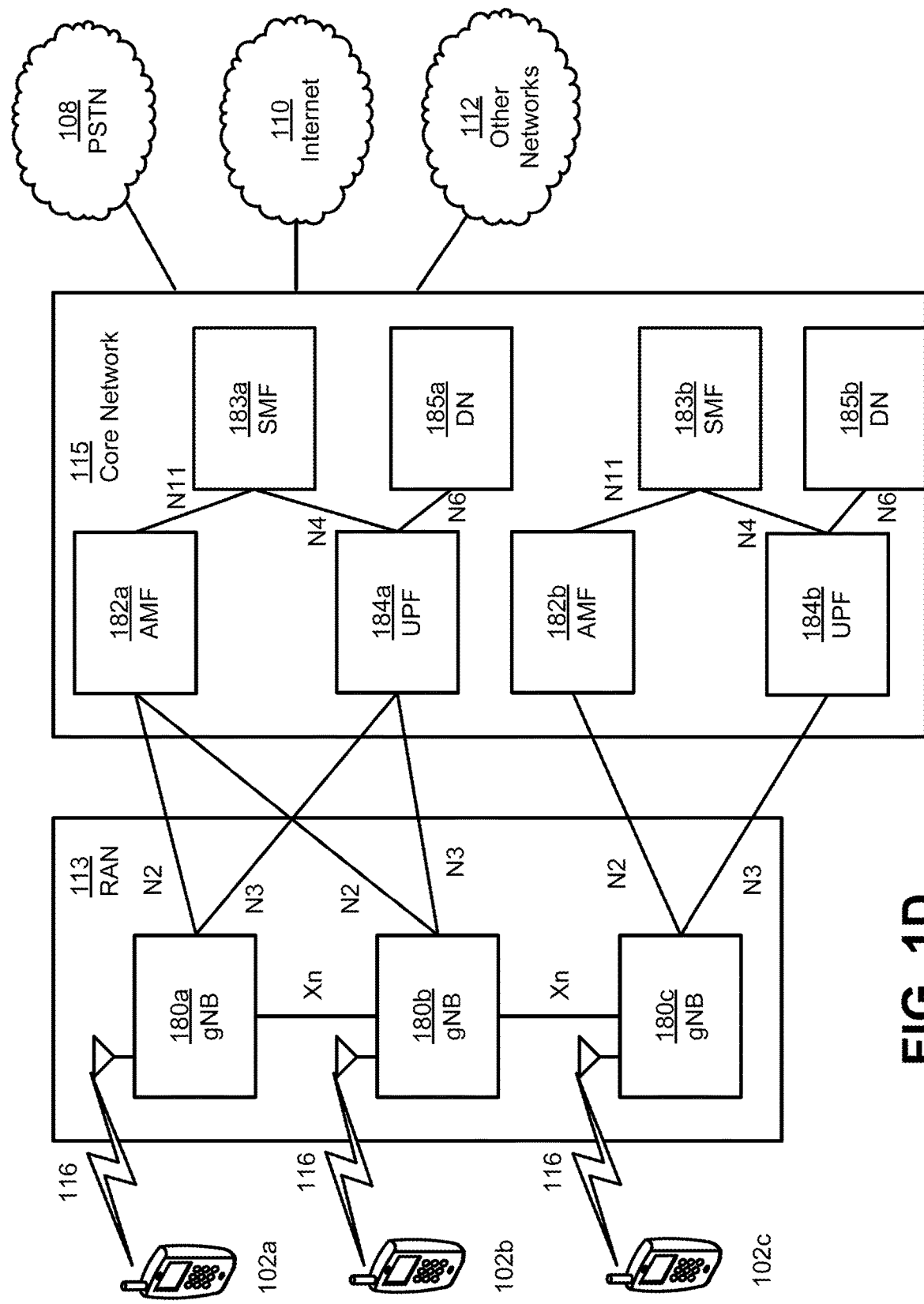
FIG. 1D is a system diagram illustrating a further example RAN and a further example CN that may be used within the communications system illustrated in FIG. 1A according to an embodiment.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements is depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different Protocol Data Unit (PDU) sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Fifth generation (5G) New Radio may employ beamforming (e.g., to address path loss). Based on the general requirements set out by ITU-R, NGMN and 3GPP, a broad classification of the use cases for emerging 5G systems may be include Enhanced Mobile Broadband (eMBB), Massive Machine Type Communications (mMTC), and Ultra Reliable and Low latency Communications (URLLC). Different use cases may focus on different requirements, such as higher data rate, higher spectrum efficiency, low power and higher energy efficiency, lower latency, and higher reliability. A wide range of spectrum bands ranging from 700 MHz to 80 GHz may be used (e.g., in a variety of deployment scenarios).

As the carrier frequency increases, severe path loss may become a crucial limitation to sufficient coverage area. Transmission in millimeter wave systems may, e.g., additionally, suffer from non-line-of-sight losses, e.g., diffraction loss, penetration loss, Oxygen absorption loss, foliage loss, etc. During initial access, a base station and WTRU (e.g., UE) may have to overcome these high path losses and discover each other. Utilizing dozens (e.g., or even hundreds) of antenna elements to generate a beam formed signal may be an effective way to compensate the severe path loss (e.g., by providing significant beam forming gain). Beamforming techniques may include digital, analogue, and hybrid beamforming.

Methods for LTE initial synchronization and broadcast channel may be implemented. A WTRU may employ a cell search procedure (e.g., to acquire time and frequency synchronization with a cell). A WTRU may detect the Cell ID of that cell. LTE synchronization signals may be transmitted in the 0th and 5th subframes of a (e.g., every) radio frame and may be used for time and frequency synchronization during initialization. As part of the system acquisition process, a WTRU may synchronize sequentially to the orthogonal frequency division multiple (OFDM) symbol, slot, subframe, half-frame, and radio frame based on the synchronization signals. For example, two synchronization signals may be provided. A Primary Synchronization Signal (PSS) may be used to obtain slot, subframe, and half-frame boundary. PSS may also provide physical layer cell identity (PCI) within the cell identity group. A Secondary Synchronization Signal (SSS) may be used to obtain the radio frame boundary. SSS may also enable the WTRU to determine the cell identity group (e.g., which may range from 0 to 167).

Following a successful synchronization and physical layer cell identity (PCI) acquisition, a WTRU may decode the Physical Broadcast Channel (PBCH) with the help of cell specific reference signal (CRS) and acquire the master information block (MIB) information regarding system bandwidth, System Frame Number (SFN), and Physical HARQ Indicator Channel (PHICH) configuration. LTE synchronization signals and PBCH may be transmitted continuously (e.g., according to a standardized periodicity).

An LTE random access (RA) procedure may be implemented. An eNB and/or a WTRU may use a random access procedure for at least one of: WTRU initial access (for example to a cell or eNB), reset of UL timing (for example to reset or align WTRU UL timing with respect to a certain cell), and reset of timing during handover (for example to reset or align WTRU timing with respect to the handover target cell). The WTRU may transmit a certain physical random access channel (PRACH) preamble sequence at a certain power PPRACH, which may be based on configured parameters and/or measurements, and the WTRU may transmit the preamble using a certain time-frequency resource or resources. The configured parameters, which may be provided or configured by the eNB, may include one or more of initial preamble power (e.g., preambleInitialReceivedTargetPower), a preamble format based offset (e.g., deltaPreamble), a random access response window (e.g., ra-ResponseWindowSize), a power ramping factor (e.g., powerRampingStep), and a maximum number of retransmissions (e.g., preambleTransMax). The PRACH resources (which may include preambles or sets of preambles and/or time/frequency resources which may be used for preamble transmission) may be provided or configured by the eNB. The measurements may include pathloss. The time-frequency resource(s) may be chosen by the WTRU from an allowed set or may be chosen by the eNB and signaled to the WTRU. Following WTRU transmission of a preamble, if the eNB may detect the preamble, it may respond with a random access response (RAR). If the WTRU may not (e.g., or does not) receive an RAR for the transmitted preamble (which may, for example, correspond to a certain preamble index and/or time/frequency resource), within an allotted time (for example, ra-ResponseWindowSize), the WTRU may send another preamble at a later time, at a higher power (for example, higher than the previous preamble transmission by powerRampingStep), where the transmission power may be limited by a maximum power, for example a WTRU-configured maximum power which may be for the WTRU as a whole (for example PCMAX) or for a certain serving cell of the WTRU (for example PCMAX,c). The WTRU may wait again for receipt of an RAR from the eNB. This sequence of transmitting and waiting may continue until the eNB may respond with a RAR or until the maximum number of random access preamble transmissions (for example, preambleTransMax) may have been reached. The eNB may transmit, and the WTRU may receive, the RAR in response to a single preamble transmission.

An instance of a random access procedure may be contention-based or contention-free. A contention-free procedure may be initiated by a request, for example from an eNB, which may, for example, be via physical layer signaling such as a Physical Downlink Control Channel (PDCCH) order or by higher layer signaling such as a radio resource control (RRC) reconfiguration message (e.g., an RRC connection reconfiguration message) which may include mobility control information and may, for example, indicate or correspond to a handover request. For a contention-free procedure which may be initiated by PDCCH order in subframe n, the PRACH preamble may be transmitted in the first subframe (or the first subframe available for PRACH) n42 where k2 may be >=6. When initiated by RRC command, there may be other delays which may be specified (for example, there may be minimum and/or maximum delays (e.g., which may be required or allowed)). The WTRU may autonomously initiate a contention-based procedure for reasons which may include for example, initial access, restoration of UL synchronization, or recovering from radio link failure. For certain events, for example events other than recovery from radio link failure, it may not be defined or specified as to how long after such an event the WTRU may send the PRACH preamble.

For a contention-free RA procedure, a network-signaled PRACH preamble may be used, e.g., by a WTRU. For a contention-based RA procedure, the WTRU may autonomously choose a preamble where the preamble format and/or the time/frequency resource(s) available for preamble transmissions may be based on an indication or index (e.g., PRACH-configIndex) which may be provided or signaled by the eNB.

One of the preambles transmitted at the progressively higher transmit powers may be detected by the eNB. A RAR may be sent by the eNB in response to a detected preamble.

A PRACH preamble may be considered a PRACH resource. For example, PRACH resources may include a PRACH preamble, time, and/or frequency resources.

The terms i) "RACH resources" and "PRACH resources," and ii) "RA," "RACH," and "PRACH," may be used interchangeably.

New Radio (NR) and unlicensed band operation may be implemented.

In wireless communication systems where a central node (e.g. gNB) serves a set of WTRUs, the opportunity to send transport blocks (TB) from those WTRUs to the central node may be administered by the central node. For example, the gNB schedules for individual WTRU uplink (UL) transmission by assigning separate time-frequency resources to (e.g., each) WTRU and granting (e.g., each) resource to a (e.g., each) WTRU. Such arrangement for UL transmission may be referred to as grant-based UL transmission. In another example, a gNB may announce the presence of one or more time-frequency resources and let a set of WTRUs use the one or more resources, hence allowing access without a specific UL grant. The use cases considered during development of 3GPP New Radio (NR) may include ultra-reliable low-latency communication (URLLC), massive machine-type communication (mMTC or MMTC), or even, in a general sense, in enhanced mobile broadband (eMBB or EMBB) communication. MMTC may be designed to enable communication between devices that are low-cost, massive in number, and battery-driven. MMTC may be intended to support applications such as smart metering, logistics, and field and body sensors. URLLC may make it possible for devices and machines to communicate with ultra-reliability, very low latency, and high availability. URLLC may be ideal for vehicular communication, industrial control, factory automation, remote surgery, smart grids, and public safety applications. EMBB may focus on enhancements to a variety of parameters such as data rate, delay, and coverage of mobile broadband access.

In unlicensed bands, a gNB or a WTRU may perform a listen-before-talk (LBT) procedure before accessing the unlicensed wireless channel. Depending on the regulatory requirements of the unlicensed channel, the LBT specifics may be different. A LBT procedure may include a fixed- and/or random-duration interval where a wireless node (e.g. a gNB or a WTRU) listens to a medium and, if the energy level detected from the medium may be more than a threshold (e.g., specified by a regulator), the gNB or WTRU refrains from transmitting any wireless signal. If the energy level detected from the medium may be less than a threshold (e.g., specified by a regulator), the gNB or WTRU transmits its desired signal after completion of the LBT procedure.

In some regulatory regimes, LBT procedures may be mandatory for unlicensed channel usage. For example, various LBT categories may be adopted in 3GPP LAA (Release 13), eLAA (Release 14), and feLAA (Release 15). The LBT Category 4 (CAT 4) scheme, adopted in LAA/eLAA, may be a preferred scheme for most of the use cases. The LBT CAT 4 procedure may start when an eNB or gNB (and in some cases a WTRU) wants to transmit control or data in an unlicensed channel. The device may conduct an initial clear channel assessment (CCA), e.g., to check if the channel may be idle for a period of time (e.g., a sum of a fixed period of time and a pseudo-random duration). The availability of the channel may be determined by comparing the level of energy detected (ED) across the bandwidth of the unlicensed channel to an energy threshold that may be determined by a regulator.

If a channel may be determined to be free, a transmission may proceed. If a channel may be determined not to be free, the device may conduct a slotted random back-off procedure, where a random number may be selected from a specified interval called the contention window. A back-off countdown may be obtained, and the channel may be verified if idle or not. A transmission may be initiated when the back-off counter goes to zero. After the eNB or gNB has gained access to the channel, it may be allowed (e.g., only allowed) to transmit for a limited duration referred to as the maximum channel occupancy time (MCOT). The CAT 4 LBT procedure with random backoff and variable contention window sizes may enable fair channel access and exhibit good coexistence with other Radio Access Technologies (RATs), such as Wi-Fi and other LAA networks.

In licensed assisted non-standalone access, an unlicensed band operation may rely on the assistance of a primary component carrier in a licensed band. In NR-U standalone operation, functionalities and features (e.g., all functionalities and features) may be fulfilled on unlicensed bands, including initial access. Initial access may be performed. Due to spectrum characteristics and regulatory requirements, e.g., uncertainty of channel availability, the Occupied Channel Bandwidth (OCB) requirement, etc., designs may be implemented to enable initial access in a licensed band to be compatible with unlicensed band operation.

For RACH, NR may support multiple RACH preamble formats (e.g., including long PRACH formats with preamble length 839 and short PRACH format with preamble length 139). For unlicensed band operation, the cell range may be smaller than that of licensed band operation (such, for example, due to limited transmission power constraint). A short PRACH format may be more suitable for the relatively small cell in NR-U unlicensed bands. During a RACH procedure, LBT may be performed (e.g., may be required to be performed). LBT failure may lead to degradation of RACH performance. LBT failure before PRACH preamble transmission may (e.g., also) impact the RACH resource configuration. A PRACH preamble transmission may fulfil a regulatory requirement of OCB. A preamble and RACH procedure for unlicensed band operation may consider the impact of LBT and the requirement of OCB for NR-U.

In NR-U, an LBT gap may be reserved at the beginning of an RO. In NR, no LBT gap may be reserved for RO. Methods for reserving a LBT for a RO (e.g., every RO) may be implemented. In NR, configurations may have consecutive ROs (e.g., implicating no gap between ROs). For NR-U, it may be desirable to perform LBT for a RO (e.g., every RO) transmission. To support low latency RACH, mapping rules for the RACH occasion (e.g., after the SS/PBCH transmission) may be implemented. Current mapping rules between RACH occasion and SSB for NR may not support low latency RACH for NR-U systems.

One or more features may be implemented as described herein for low latency PRACH associated with a synchronization signal block (SSB) transmission.

To map a RACH occasion (RO) after the SS/PBCH transmission, a mapping rule between a RACH occasion and an SSB, e.g., for NR-U, may be implemented. Rules, e.g., current mapping rules, between RACH occasion and SSB for NR may not support low latency RACH for NR-U systems. To support low latency RACH, mapping rules for a RACH occasion to be located after the associated SS/PBCH transmission (e.g., SSB block) may be provided herein.

In NR systems, a mapping between an RO and SSB may be configured by a number of SS/PBCH blocks (e.g., N) associated with a PRACH occasion (e.g., one occasion) and a number of contention based preambles per SS/PBCH block (e.g., R) by higher layer parameter ssb-perRACH-OccasionAndCB-PreamblesPerSSB. If N<1, one SS/PBCH block may be mapped to N consecutive ROs, and in an RO (e.g., every RO), there may be R contention based preambles. If N≥1, N SSBs may be mapped to an RO (e.g., every RO), and R contention based preambles with consecutive indexes associated with SS/PBCH block n, 0≤n≤N−1, per PRACH occasion may start from preamble index n·64/N. In examples, SS/PBCH block indexes may be mapped (e.g., first mapped) to PRACH occasions in one or more of the following order: increasing order of preamble indices within a single PRACH occasion; increasing order of frequency resource indices for frequency multiplexed PRACH occasions; increasing order of time resource indices for time multiplexed PRACH occasions within a PRACH slot; and/or increasing order of indices for PRACH slots.

PRACH occasion and RACH occasion (RO) may be used interchangeably.

In examples, the SSB(s) and RO(s) within one PRACH configuration period may be as depicted in FIG. 2. FIG. 2 is an example of synchronization signal block (SSB) and random access channel (RACH) occasion (RO) configuration.

FIG. 3 is an example of a mapping between SSB and RO for New Radio (NR). When ssb-perRACH-Occasion is configured as ½, according to NR mapping, the associations between SSB and RACH occasions may be as depicted in FIG. 3. In the example of FIG. 3, an SSB may not be followed by an RO with a like index. The term followed by may be referred to herein as adjacent to (e.g., FIG. 3 illustrates SSB2 being followed by (being adjacent to) RO-SSB2, and, SSB1 being followed by (being adjacent to) RO-SSB0). By the example NR mapping, if a WTRU chooses SSB2, the WTRU may (e.g., immediately) transmit the RACH preamble after receiving SSB2. The corresponding LBT for PRACH transmission may be avoided or skipped and the number of LBTs may be reduced for WTRU's random access and the WTRU may not wait to access the channel separately for PRACH. Not waiting to access the channel separately may reduce (e.g., significantly) the delay and latency for random access in NR-U. A mapping rule between SSB and RO may support a type of association. For example, two types of association may be defined and used. For the first category mapping, the RO may follow a transmitted SSB with index i, and that SSB with index i may be associated with the RO that follows it (e.g., is adjacent to it). In this example, the SSB index I and RO may have Category-I mapping (e.g., FIG. 3). Others may belong to Category-II mapping.

For NR-U, mapping rules may be implemented as follows, e.g., in order: increasing order of preamble indexes within a single PRACH occasion; increasing order of frequency resource indexes for frequency multiplexed PRACH occasions; increasing order of time resource indexes for time multiplexed PRACH occasions within a PRACH slot; increasing order of indexes for PRACH slots; and/or, for a type I RO, with the actually transmitted SSB j ahead of it (e.g., before it/adjacent to it, for example as shown in the FIGS.) and mapping to SSB i, if i is not equal to j, the mapping may be switched for the RO and the mapping for a next RO that may be associated with SSB index i (e.g., switch the RO so that the SSB has a following RO that is adjacent to it with the same index, see FIGS. 4A and 5A).

For the example in FIG. 2, RO 0, RO 1, RO 2 and RO 3 may be type I ROs. For RO 0 and RO 1, NR may map them to SSB 0, while the SSB ahead of it may be SSB 1. According to a proposed mapping for NR-U (e.g., for a type I RO, with the actually transmitted SSB j ahead of it and mapping to SSB i, if i is not equal to j, the mapping may be switched for the RO and the mapping for a next RO that may be associated with SSB index i), the mapping for RO 0 and RO 1 may be switched with the mapping for RO 2 and RO3. For example, a mapping for NR-U using such a rule may be given in FIG. 4A. FIG. 4A is an example implementation of mapping between SSB and RO for NR unlicensed (NR-U) (e.g., that switches the order of FIG. 3 to locate RO-SSB1 to follow SSB1, e.g., adjacent to SSB1).

Figure 4B:
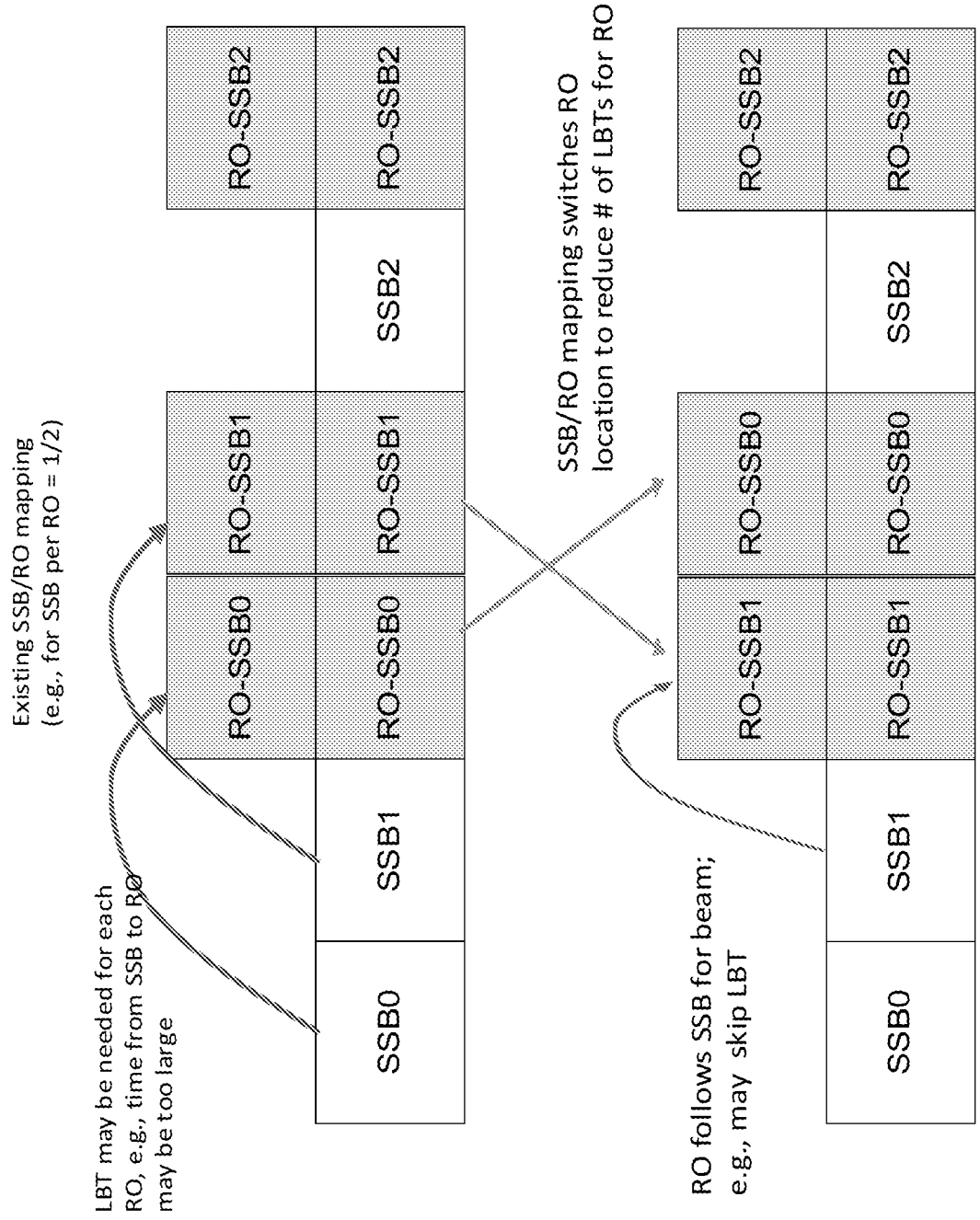
FIG. 4B is an example of switching ROs.
Figure 5A:
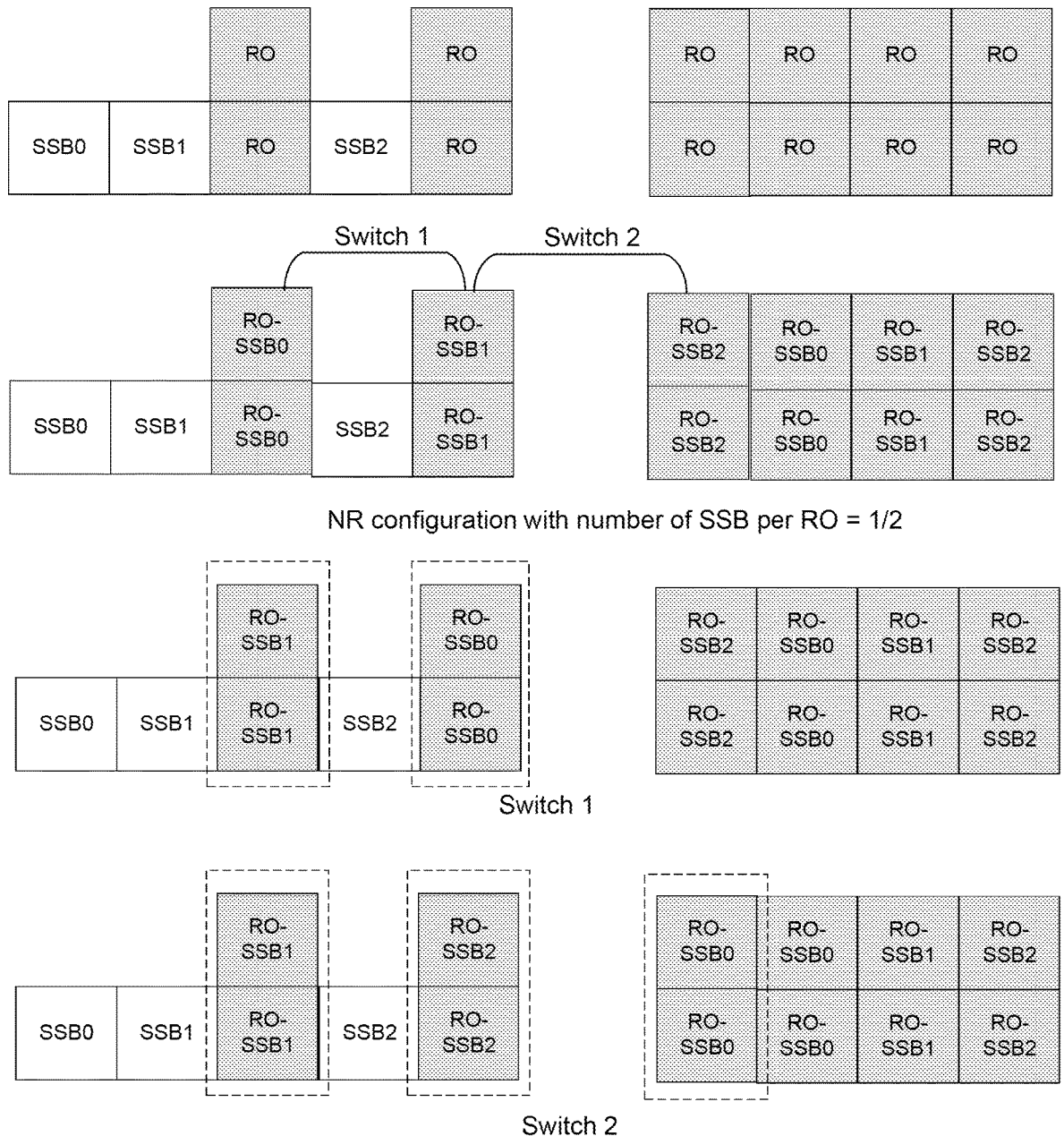
FIG. 5A is an example of a RACH delay reduction mapping.

In FIG. 4A, SSB1 and SSB2 may be associated with the RO that follows them respectively (e.g., SSB1 is associated with RO-SSB1 and SSB2 is associated with RO-SSB2 as shown in FIG. 4A), and, LBT may be saved (e.g., may not be performed). For example, when a WTRU chooses SSB1, that WTRU may transmit the RACH preamble after the SSB1 without LBT (e.g., in RO1 as shown in FIG. 4A). This may reduce the latency for random access due to LBT. The described mapping/switching and saved LBT may be as illustrated in FIG. 4B.

Figure 5B:
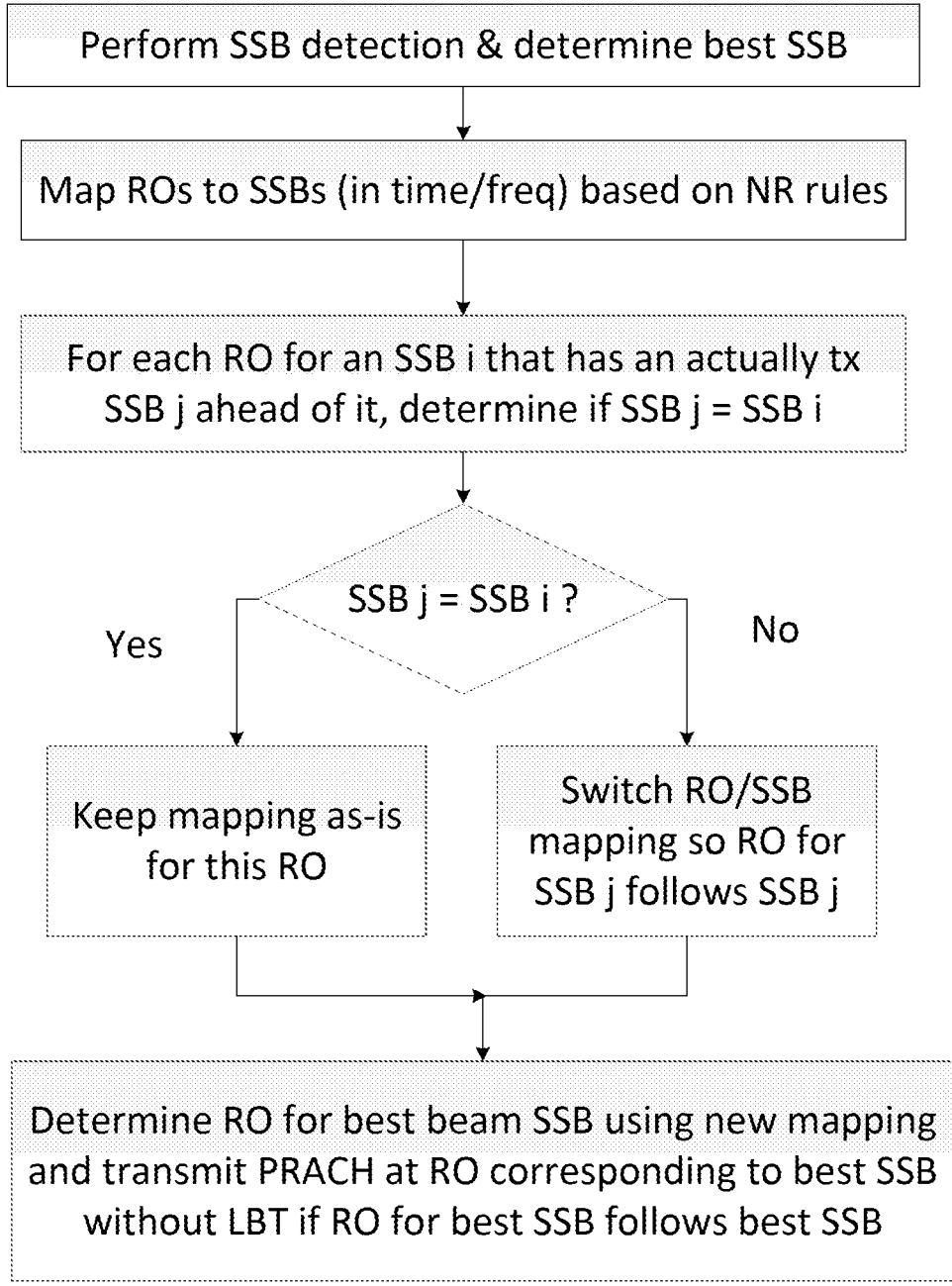
FIG. 5B illustrates example mapping features associated with an RO switch.

The delays between different ROs may be different. For example, some SSBs may experience a larger delay until its associated RO. FIG. 5A is an example of a RACH delay reduction mapping. In FIG. 5A, after switching, the mapping between SSBs and ROs may be given in the bottom sub-figure (e.g., where the first two RACH time instances are associated with SSB1 and SSB2 respectively, even though SSB0 may be transmitted earliest within one period). The delay between SSB0 and the associated RO may be larger than the delay between SSB1/SSB2 and the associated ROs. The delay for ROs associated with SSB1 and SSB2 may be reduced. In addition, LBT may not be necessary for ROs associated with SSB1 and SSB2 because as shown in FIG. 5A, the ROs associated with SSB1 and SSB2 have the same index as their respective associated SSB, which may significantly reduce the latency for these RO transmissions. There may be one or more switches in FIG. 5A, for example, where an RO-SSB is switched to locate it with a like-indexed RO-SSB (e.g., the switched RO-SSB follows right after the like-indexed SSB., e.g., they (SSB1 and RO1) are adjacent to each other). FIG. 5B illustrates the mapping features described above in order to perform a switch (e.g., as illustrated in FIGS. 4A and 5A).

Figure 6:
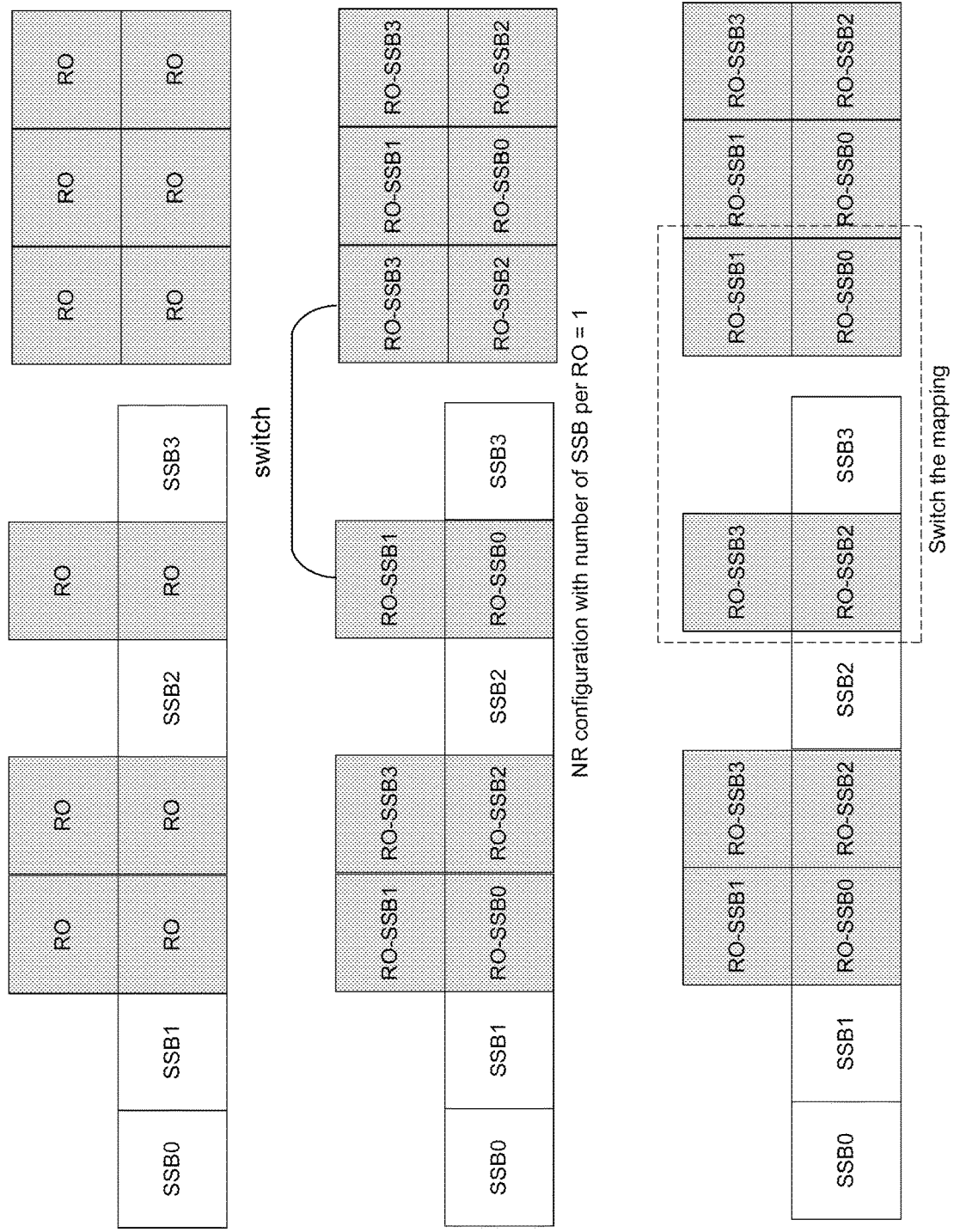
FIG. 6 is an example of a RACH delay reduction mapping.

FIG. 6 is an example of a RACH delay reduction mapping. For example, FIG. 6 illustrates that the original RO that follows SSB2 is RO0. The mapping switches the RO following SSB2. As illustrated in the bottom frame of FIG. 6, the RO following SSB2 is switched to RO2 (e.g., RO-SSB2). The switch may allow the WTRU to transmit a RACH preamble right after SSB2 without a LBT because the RO following SSB2 has a same index as SSB2 in the bottom frame.

Figure 7:
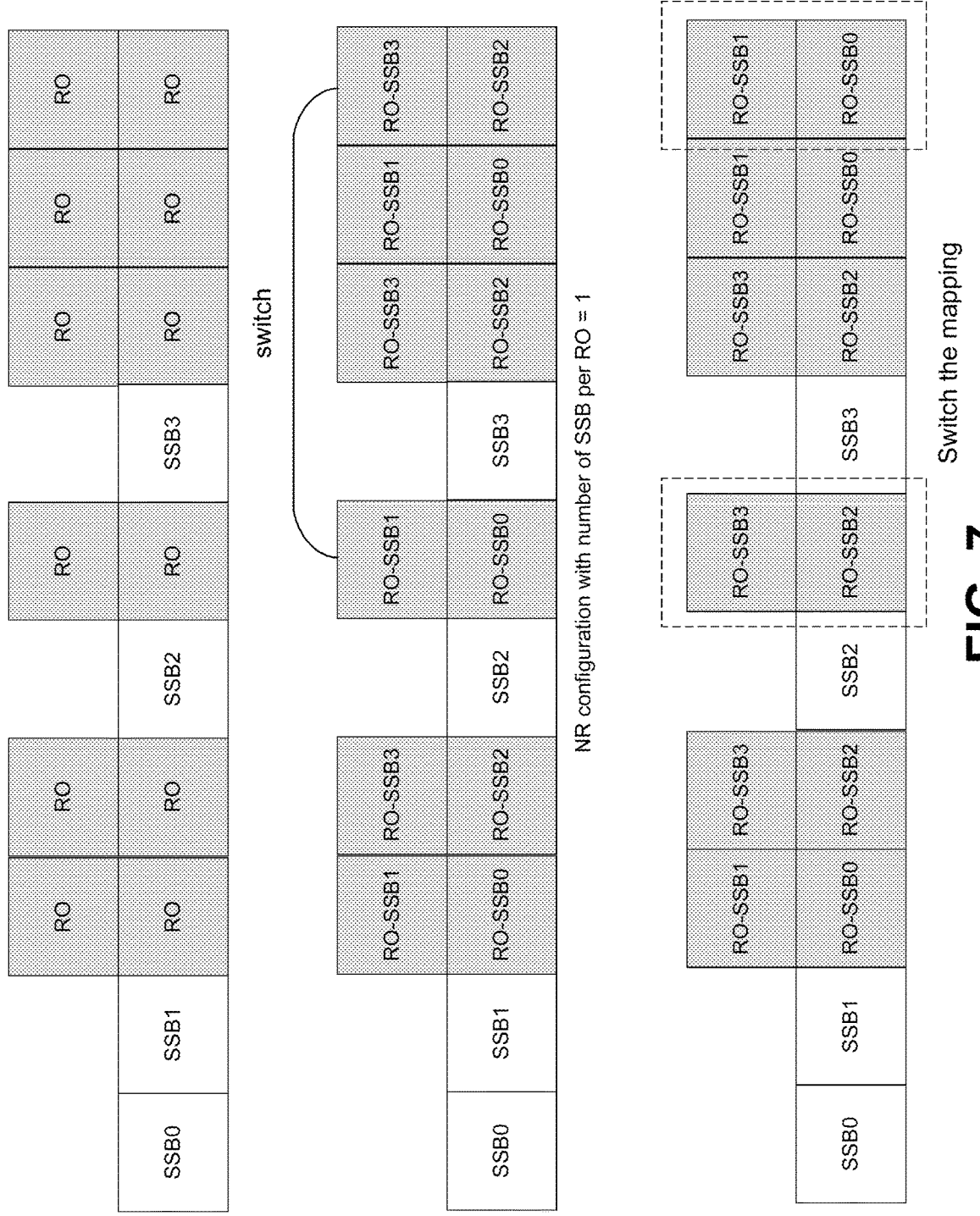
FIG. 7 is an example of a RACH delay reduction mapping.

FIG. 7 is an example of a RACH delay reduction mapping. FIG. 7 illustrates a switch with another position. The switch may allow the WTRU to transmit a RACH preamble after SSB2 without a LBT because the RO following SSB2 has a same index as SSB2 in the bottom frame.

Such mapping rules may be specified in a specification. Such mapping rules may be predefined, predetermined, or preconfigured. Such mapping rules may be configured by a gNB or network. Mapping rules may be configured based on one or more of the following: user cases, applications, requirements (e.g., latency), performance (LBT failure), overhead (number of LBT performed), etc. For example, mapping rules may be configured or chosen to enable low latency random access.

Downlink control information may be used to indicate the RO resources and locations, e.g., in addition to the already configured ROs. For example, the PDCCH may carry RO indication information to allocate additional RO(s) for use by a WTRU. The additional RO(s) may be allocated right after an SSB. Downlink control information may be used to override the RO resources and locations that are already configured or chosen. For example, downlink control information may be used to override the RO resources and locations that are configured in remaining minimum system information (RMSI) or RRC.

Mapping rules may be extended such that an SSB and RO are closer to each other even though they may not be adjacent to each other.

A rule based LBT gap for a RO in NR-U may be implemented.

In NR-U, before transmitting preambles, a WTRU may perform LBT to access the channel status. If the channel is free, the WTRU may send the preamble. If the channel is not free, the WTRU may postpone the preamble transmission. Before transmitting the preamble, a network may reserve a time duration for a WTRU that may be determined to send a preamble to perform LBT. In PRACH in NR, no LBT gap may be reserved for RACH occasion. One or more features, e.g., for NR-U, to configure LBT for PRACH may be provided.

In NR, some of PRACH configurations may have consecutive ROs, which may imply that there may be no gap between two ROs. In a case of consecutive ROs, NR-U may have to provide for how to perform LBT for consecutive ROs (e.g., every RO). An example (e.g., PRACH Configuration Index 81), is shown in Table 1:

TABLE 1

| PRACH Configuration Index | Preamble format | $n_{SFN}$ mod x = y | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 81 | A1 | 1 | 0 | 9 | 0 | 2 | 6 | 2 |

Figure 8:
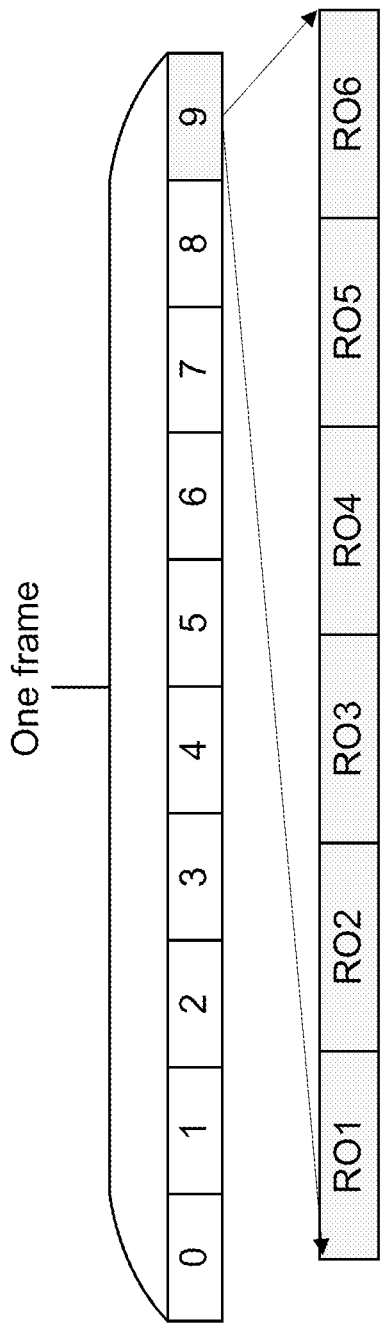
FIG. 8 is an example of consecutive ROs within a slot.

There may be consecutive ROs within one slot. FIG. 8 is an example of consecutive ROs within a slot. For example, NR-U may specify when to perform LBT for a WTRU sending preambles in RO2-RO6.

Feature(s) for adding an LBT gap based on NR PRACH configurations may be implemented.

In examples, the preamble format may be redesigned and a blank gap at the beginning of a preamble format for LBT may be reserved.

In examples, RO may be invalidated alternately. For example, in FIG. 8, RO2, RO4, and RO6 may be made invalid ROs (e.g., to make room for LBT).

Figure 9:
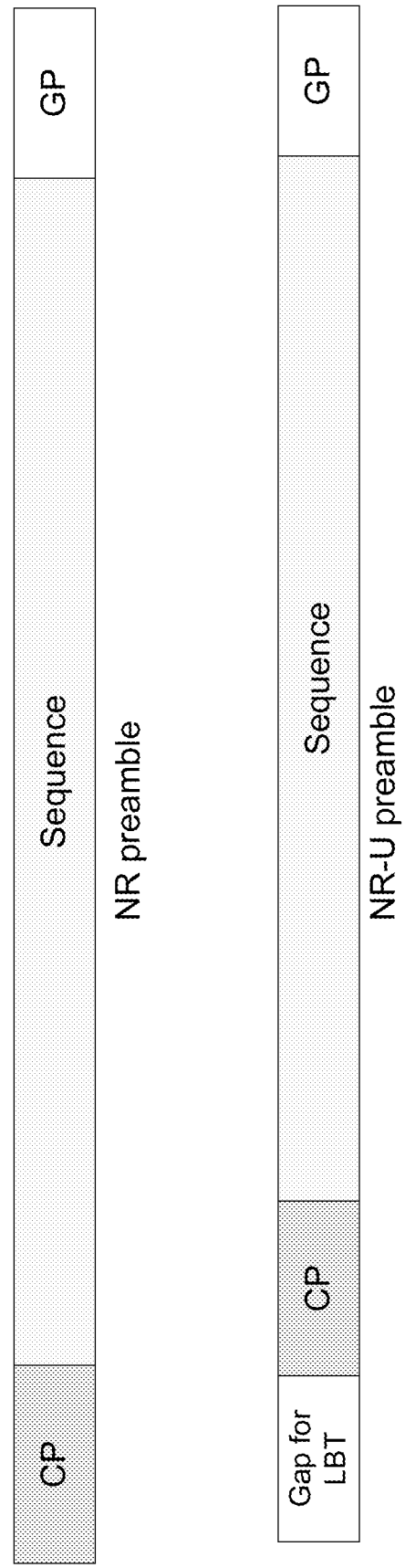
FIG. 9 is an example of a preamble format with a gap for a listen-before-talk (LBT) procedure.

In examples, the LBT may be performed at the beginning of the consecutive ROs (FIG. 9). A channel reservation signal may be used before transmitting preambles.

In NR, the preamble format may be comprised of a CP part, sequence part, and GP part. For format A there may be no GP part. In order to reserve an LBT gap, a preamble format may be redesigned to include a gap for LBT before CP, where a preamble format may have a gap for LBT, CP part, sequence part, and/or GP.

FIG. 9 is an example of a preamble format with a gap for a listen-before-talk (LBT) procedure.

As noted, in examples, NR-U may invalidate the RO alternately (e.g., in order to reserve the gap for LBT). Returning to FIG. 8, the RO2, RO4, and RO6 may be invalid, and, for example, RO2 and RO4 may be used for LBT.

In an example where the LBT may be performed at the beginning of the consecutive ROs, the WTRU may (e.g., perform the LBT at the beginning of consecutive ROs) use the reservation signal to reserve a channel before sending the preamble. FIG. 11 is an example of reservation signals for consecutive ROs.

A WTRU preparing to send a preamble at RO3 may perform the following. The WTRU may perform LBT at the beginning of consecutive ROs that include the selected RO (e.g., RO3 at the beginning). If the channel is busy, the WTRU may wait for the next appropriate RO (and may (e.g. then) perform LBT). If the channel is free, the WTRU may send the reservation signal at RO1 and RO2. The WTRU may send the preamble at RO3.

The reservation signal may be selected to not interfere with the preamble transmission of WTRUs (e.g., other WTRUs) in RO1 and RO2. In an example, the reservation signal may be one of PRACH preambles. A gNB may configure one (or more) particular preamble or preamble index (e.g., one of index 0-63 in NR) to be reserved for reservation signal.

In NR, some PRACH configurations may have an isolated RO (e.g., not adjacent to other ROs nor SSB). For example, the PRACH configuration index 7 in low frequency and time division duplexing (TDD) may be configured as in TABLE 2.

TABLE 2

| PRACH Configuration Index | Preamble format | $n_{SFN}$ mod x = y | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 7 | 0 | 1 | 0 | 9 | 0 | — | — | 0 |

FIG. 10 is an example of LBT ROs (e.g., RO2, RO4, and RO6 may be invalid, and, for example, the RO2 and RO4 may be used for LBT).

If a WTRU determines to send a preamble at RO3, the following may be performed. The WTRU may perform LBT at RO2. If the channel is free, the WTRU may send the preamble at RO3. If the channel is not free, the WTRU may wait for the next RO that may be associated with the selected SSB to perform the RACH.

FIG. 12 is an example of an isolated RO. The RO may be within one frame. For this type of RO, NR-U may configure LBT in subframe 8 (e.g., just before the RO). In an example, the NR-U may employ a redesigned preamble with LBT gap.

In NR, there may be some PRACH configurations where some ROs are adjacent to SSB(s). For example, the PRACH configuration index 15 in low frequency and TDD may be configured as in TABLE 3.

TABLE 3

| PRACH Configuration Index | Preamble format | $n_{SFN}$ mod $x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 15 | 0 | 1 | 0 | 1 | 0 | — | — | 0 |

Figure 13:
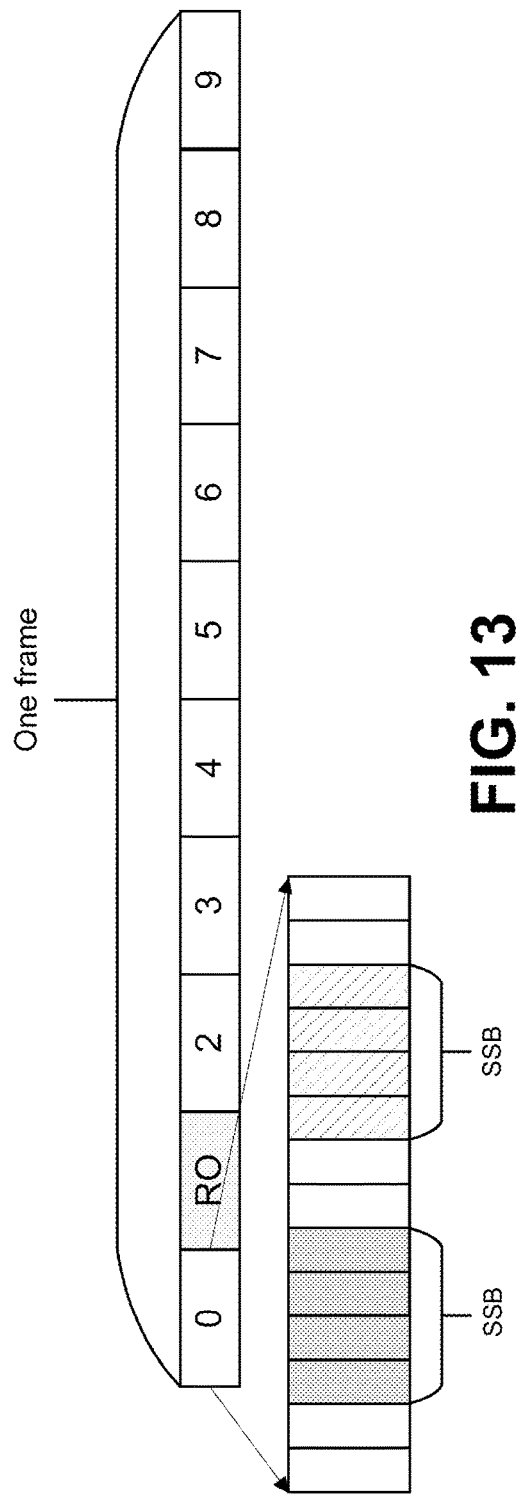
FIG. 13 is an example of an RO adjacent to a SSB.

FIG. 13 is an example of an RO adjacent to a SSB. The RO may be within one frame. In this configuration, there may be two OFDM symbols between the SSB and the configured RO. The two-symbol gap may be reserved for DL/UL switching. In NR-U, preceding the ROs, the NW may configure a gap for LBT. As there may be symbols between SSB and RO (e.g., two), and the two symbols may be used for DL/UL switching, there may be no gap for PRACH LBT. To perform LBT for this type of RO, a preamble format with a LBT gap may be used (e.g., redesign the preamble format and reserve a blank gap at the beginning of a preamble format for LBT (e.g., as shown in FIG. 9)).

How to perform LBT may be indicated in one or more of the following: SSB, RACh message 1, message 2, message 3, or message 4. For example, an LBT category may be indicated in an SSB for a WTRU to perform LBT for random access using the indicated LBT category. LBT category may indicate one or more of the following: LBT gap, channel occupancy time (COT), etc. LBT category may be indicated in a PRACH for gNB to perform LBT for subsequent random access steps (e.g., RACH message 2 or RAR, RACH message 4) using the indicated LBT category. LBT category may be indicated in RACH message 2 or random access response (RAR) for the WTRU to perform LBT for subsequent random access steps (e.g., RACH message 3) using the indicated LBT category. LBT category may be indicated in RACH message 3 for gNB to perform LBT for subsequent random access steps (e.g., RACH message 4) or subsequent transmission (e.g., downlink transmission) using the indicated LBT category. LBT category may be indicated in RACH message 4 for WTRU to perform LBT for subsequent transmission (e.g., uplink transmission) using the indicated LBT category.

In the case of 2-step RACH, an LBT category may be indicated in a RACH message A transmission (e.g., the $1^{st}$ step) for gNB to perform LBT for subsequent transmission (e.g., RACH message B transmission in the $2^{nd}$ step) using the indicated LBT category. The LBT category may be indicated in an RMSI or OSI for the WTRU to perform LBT for subsequent transmission (e.g., RACH message A transmission in the $1^{st}$ step) using the indicated LBT category. The LBT category may be indicated in an SS block (SSB) such as in a PBCH payload for a WTRU to perform LBT for subsequent transmission (e.g., RACH message A transmission in the $1^{st}$ step) using the indicated LBT category.

A timing advance (TA) adjusted UL interference reduction for LBT may be implemented.

Figure 15:
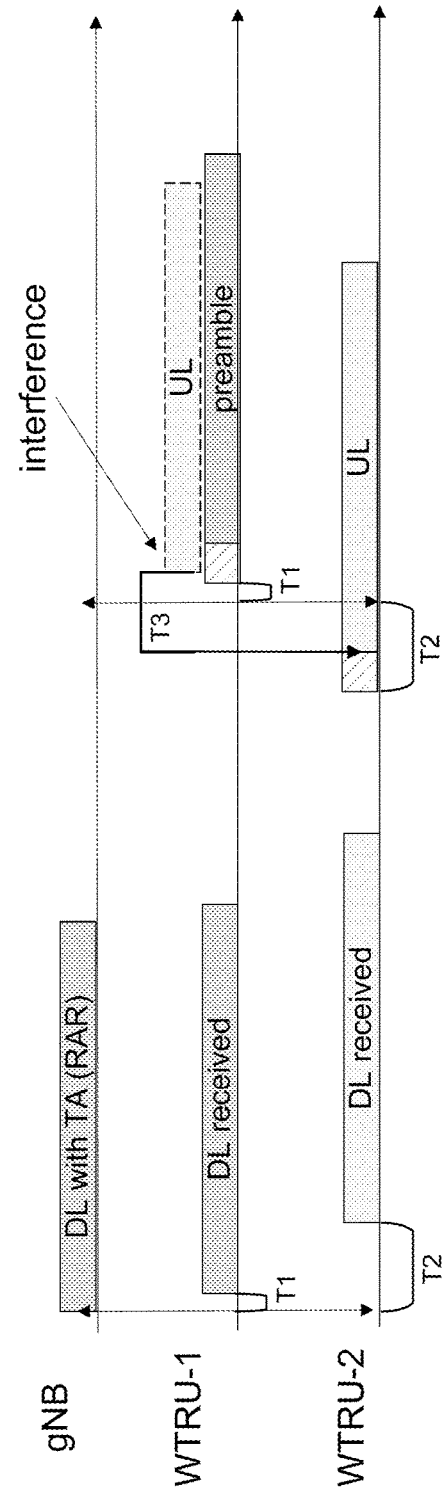
FIG. 15 is an example of a rule-based TA adjusted UL interference reduction for LBT.
Figure 14:
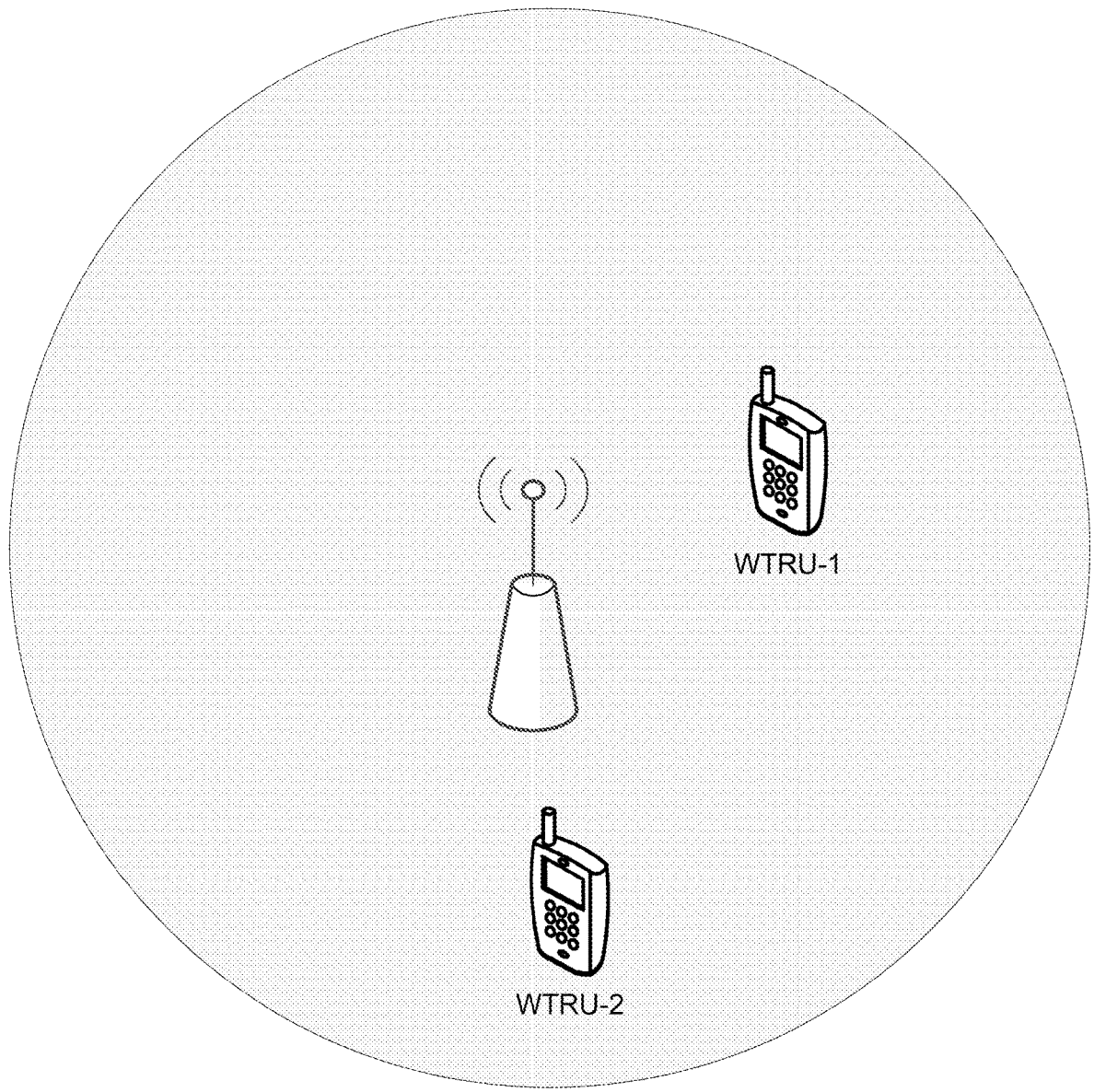
FIG. 14 is an example of a timing advance (TA) adjusted uplink (UL) interference.

FIG. 14 is an example of a TA adjusted uplink (UL) interference. For example, WTRU-1 may transmit a preamble, while WTRU-2 may be assigned a UL transmission in the same slot. FIG. 15 is an example of a rule-based TA adjusted UL interference reduction for LBT. WTRU-2's UL transmission with TA may interfere with WTRU-1's preamble transmission, as $T3<T1+T2$.

If UL transmission with TA adjustment is scheduled simultaneously with preamble transmission, the LBT of preamble transmission may be interfered by the UL transmission with TA adjustment. WTRU-1's LBT for preamble transmission may be interfered by WTRU-2's UL transmission with TA adjustment.

Feature(s) may be implemented to avoid the interference of WTRU-2 to WTRU-1's LBT. FDM of PRACH and PUSCH in NR-U may be dynamically or semi-statically deactivated or disabled. A blank gap at the beginning of PUSCH (e.g., which may be FDMed with PRACH) may be added.

Although implementations described herein may consider LTE, LTE-A, New Radio (NR) or 5G specific protocols, it is understood that the solutions described herein are not restricted to this scenario and may be applicable to other wireless systems as well. The processes and instrumentalities described herein may apply in any combination, may apply to other wireless technologies, and for other services.

Each of the computing systems described herein may have one or more computer processors having memory that are configured with executable instructions or hardware for accomplishing the functions described herein including determining the parameters described herein and sending and receiving messages between entities (e.g., WTRU and network) to accomplish the described functions.

Features described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:
1. A wireless transmit/receive unit (WTRU), comprising:
a processor configured at least in part to:
determine, based on first configuration information, a first order associated with a plurality of synchronization signal (SS)/physical broadcast channel (PBCH) blocks (SSBs) and a plurality of PRACH occasions (ROs), wherein, in the determined first order, a first RO is next in time after a first SSB;

determine, based on the first configuration information, that the first RO is associated with one of: the first SSB or an SSB other than the first SSB; and
send a preamble,
wherein:
if the first RO is determined to be associated with the first SSB, send, according to the determined first order, the preamble in the first RO after reception of the first SSB, and
if the first RO is determined to be associated with the SSB other than the first SSB: determine, based on second configuration information, a second order associated with the plurality of SSBs and the plurality of ROs,
wherein, in the determined second order, a second RO is next in time after the first SSB, and send, according to the determined second order, the preamble in the second RO after the reception of the first SSB.

2. The WTRU of claim 1, wherein the processor is further configured to
receive the first configuration information, and
wherein the first configuration information is associated with a first mapping.

3. The WTRU of claim 2,
wherein the received first configuration information is associated with a number of SSBs, and
wherein the number of SSBs are associated with a single PRACH occasion and a number of contention-based preambles per SSB.

4. The WTRU of claim 3,
wherein the received first configuration information comprises a higher layer parameter, and
wherein the higher layer parameter indicates the number of SSBs.

5. The WTRU of claim 1,
wherein the first RO is associated with the first SSB if the first RO is indicated as being matched with the first SSB based on the first configuration information and a first mapping.

6. The WTRU of claim 1,
wherein the second order is determined based on second configuration information,
wherein the second configuration information comprises a second mapping, and
wherein the second RO is determined to be associated with the first SSB if the second RO is identified as being matched with the first SSB based on the first configuration information and the second mapping.

7. The WTRU of claim 1, wherein:
the processor being configured to send the preamble in the first RO after reception of the first SSB comprises the processor being configured to send the preamble in the first RO after the reception of the first SSB without performing a listen before talk operation, and
the processor being configured to send the preamble in the second RO after the reception of the first SSB comprises the processor being configured to send the preamble in the second RO after the reception of the first SSB without performing the listen before talk operation.

8. The WTRU of claim 1, wherein:
the processor being configured to send the preamble in the first RO after reception of the first SSB is based on the first RO being next in time after the first SSB and comprises the processor being configured to send the preamble in the first RO after reception of the first SSB without performing a listen before talk operation, and
the processor being configured to send the preamble in the second RO after the reception of the first SSB is based on the second RO being next in time after the first SSB and comprises the processor being configured to send the preamble in the second RO after the reception of the first SSB without performing the listen before talk operation.

9. The WTRU of claim 1,
wherein the first RO is associated with a single SSB out of the first SSB and the SSB other than the first SSB, and
wherein the single SSB is the SSB other than the first SSB.

10. A method implemented in a wireless transmit/receive unit (WTRU), comprising:
determining, based on first configuration information, a first order associated with a first plurality of synchronization signal (SS)/physical broadcast channel (PBCH) blocks (SSBs) and a first plurality of PRACH occasions (ROs),
wherein, a first RO in the determined first order is next in time after a first SSB in the determined first order;
determining, based on the first configuration information, that the first RO in the determined first order is associated with an SSB other than the first SSB in the determined first order;
determining, based on the first RO in the determined first order being associated with the SSB other than the first SSB in the determined first order, a second order associated with the first plurality of SSBs and the first plurality of ROs,
wherein, a second RO in the determined second order is next in time after the first SSB in the determined second order; and
send, according to the determined second order, a preamble in the second RO after the reception of the first SSB.

11. The method of claim 10, further comprising
receiving the first configuration information, and
wherein the first configuration information is associated with a first mapping.

12. The method of claim 11,
wherein the received first configuration information is associated with a number of SSBs, and
wherein the number of SSBs are associated with a single PRACH occasion and a number of contention-based preambles per SSB.

13. The method of claim 10, further comprising:
determining a third order associated with a second plurality of SSBs and a second plurality of ROs,
wherein, a first RO in the determined third order is next in time after a first SSB in the determined third order,
determining that the first RO in the determined third order is associated with the first SSB in the determined third order; and
sending the preamble in the first RO in the determined third order after reception of the first SSB in the determined third order.

14. The method of claim 10, wherein:
sending the preamble in the second RO after the reception of the first SSB comprises sending the preamble in the second RO after the reception of the first SSB without performing a listen before talk operation.

15. The method of claim 10, wherein,
sending the preamble in the second RO after the reception of the first SSB is based on the second RO being next in time after the first SSB and comprises sending the preamble in the second RO after the reception of the first SSB without performing a listen before talk operation.

16. A wireless transmit/receive unit (WTRU), comprising:
a processor configured at least in part to:
determine, based on first configuration information, a first order associated with a plurality of synchronization signal (SS)/physical broadcast channel (PBCH) blocks (SSBs) and a plurality of PRACH occasions (ROs),
wherein, in the determined first order, a first RO is next in time after a first SSB;
determine, based on the first configuration information, that the first RO is associated with an SSB other than the first SSB;
determine, based on the first RO being associated with the SSB other than the first SSB, a second order associated with the plurality of SSBs and the plurality of ROs, and
send, according to the determined second order, a preamble in the second RO after reception of the first SSB.

17. The WTRU of claim 16,
wherein the processor is further configured to:
determine a third order associated with a second plurality of SSBs and a second plurality of ROs,
wherein a first RO in the determined third order is next in time after a first SSB in the determined third order;
determine that the first RO in the determined third order is associated with the first SSB in the determined third order; and
send the preamble in the first RO in the determined third order after reception of the first SSB in the determined third order.

18. The WTRU of claim 17,
wherein the determination of the third order is based on third configuration information.

19. The WTRU of claim 16, wherein:
the processor being configured to send the preamble in the second RO after the reception of the first SSB comprises the processor being configured to send the preamble in the second RO after the reception of the first SSB without performing a listen before talk operation.

20. The WTRU of claim 16,
wherein the processor being configured to send the preamble in the second RO after the reception of the first SSB is based on the second RO being next in time after the first SSB and comprises the processor being configured to send the preamble in the second RO after the reception of the first SSB without performing a listen before talk operation.

21. The WTRU of claim 16,
wherein the determination of the second order is based on second configuration information.

* * * * *